United States Patent
Brouwer et al.

(10) Patent No.: US 10,980,256 B2
(45) Date of Patent: Apr. 20, 2021

(54) APPARATUS FOR THERMALLY PROCESSING FOOD PACKAGES COMPRISING PRODUCT CARRIERS WITH POSITIVE PACKAGE HANDLING

(71) Applicant: JBT Food & Dairy Systems B.V., Amsterdam (NL)

(72) Inventors: Adalbert François Jacob Brouwer, Amsterdam (NL); Tsjip Sebastian Van Der Leeuw, Amsterdam (NL); Jan Marc Roemer, Amsterdam (NL)

(73) Assignee: JBT Food & Dairy Systems B.V., Amsterdam (NL)

( * ) Notice: Subject to any disclaimer, the term of this patent is extended or adjusted under 35 U.S.C. 154(b) by 453 days.

(21) Appl. No.: 15/313,491

(22) PCT Filed: May 20, 2015

(86) PCT No.: PCT/NL2015/050364
§ 371 (c)(1),
(2) Date: Nov. 22, 2016

(87) PCT Pub. No.: WO2015/178772
PCT Pub. Date: Nov. 26, 2015

(65) Prior Publication Data
US 2017/0143015 A1    May 25, 2017

(30) Foreign Application Priority Data
May 23, 2014    (NL) ..................................... 2012876

(51) Int. Cl.
| A23L 3/04 | (2006.01) |
| A23L 3/02 | (2006.01) |
| B65B 55/00 | (2006.01) |
| B65B 55/14 | (2006.01) |

(52) U.S. Cl.
CPC .............. *A23L 3/045* (2013.01); *A23L 3/022* (2013.01); *A23L 3/04* (2013.01); *B65B 55/00* (2013.01); *B65B 55/14* (2013.01); *A23V 2002/00* (2013.01)

(58) Field of Classification Search
CPC . A23L 3/045; A23L 3/022; A23L 3/04; B65B 55/00; B65B 55/14; A23V 2002/00
(Continued)

(56) References Cited

U.S. PATENT DOCUMENTS

| 3,774,778 A | * | 11/1973 | Flaig ....................... B65B 35/38 |
| | | | 414/591 |
| 4,740,136 A | * | 4/1988 | Asai ................... H01L 21/6838 |
| | | | 221/74 |

(Continued)

FOREIGN PATENT DOCUMENTS

| CN | 101374725 A | 2/2009 |
| CN | 102361806 A | 2/2012 |

(Continued)

OTHER PUBLICATIONS

International Search Report and Written Opinion dated Aug. 5, 2015, issued in corresponding International Application No. PCT/NL2015/050364, filed May 20, 2015, 9 pages.

(Continued)

*Primary Examiner* — Dana Ross
*Assistant Examiner* — Michael S. Poetzinger
(74) *Attorney, Agent, or Firm* — Christensen O'Connor Johnson Kindness PLLC

(57) ABSTRACT

An apparatus for thermally processing food products in sealed packages comprises heating/cooling chambers with an endless conveyor guided through them with product carriers connected thereto. Each product carrier 10 comprises insertion spaces 17 for packages 27 to be placed in. A (Continued)

Step 4 side wall 11 of the carrier 10 comprises slits 20 which open out towards insertion openings of the respective insertion spaces 17. Operating members are provided which comprise load bearing organs 32 with operable holding means 33 for picking up and carrying packages 27. The load bearing organs 32 are movable in an insertion direction x while projecting through the slits 20 during placing of packages 27 into the insertion spaces 17.

11 Claims, 14 Drawing Sheets

(58) Field of Classification Search
USPC .............. 99/360, 361, 362, 367, 427, 443 C, 99/443 R, 477, 478, 479, 483; 426/392–407, 521; 53/282, 425; 414/749.5, 733, 735, 740, 222.11
See application file for complete search history.

(56) References Cited

U.S. PATENT DOCUMENTS

| | | | | |
|---|---|---|---|---|
| 5,488,815 A | * | 2/1996 | Abrams | ................ B65B 25/008 53/425 |
| 7,089,717 B2 | * | 8/2006 | Guttinger | ................ B65B 5/068 53/251 |
| 2004/0221549 A1 | * | 11/2004 | Guttinger | ................ B65B 5/106 53/443 |

FOREIGN PATENT DOCUMENTS

| | | | | |
|---|---|---|---|---|
| CN | 102673823 A | | 9/2012 | |
| EP | 0 891 781 A2 | | 1/1999 | |
| EP | 0891781 A2 | * | 1/1999 | ............. A23L 3/045 |
| GB | 2 074 528 A | | 11/1981 | |
| GB | 2074528 A | * | 11/1981 | ............. A23L 3/001 |
| WO | 88/04143 A1 | | 6/1988 | |

OTHER PUBLICATIONS

International Preliminary Report on Patentability dated Sep. 16, 2016, issued in corresponding International Application No. PCT/NL2015/050364, filed May 20, 2015, 16 pages.

Second Written Opinion dated May 6, 2016, issued in corresponding International Application No. PCT/NL2015/050364, filed May 20, 2015, 6 pages.

Office Action dated Dec. 11, 2019, issued in corresponding Chinese Application No. 201580039606.9, filed May 20, 2015, 23 pages.

* cited by examiner

Step 1

Step 2

Step 3

Step 4

Step 5

Step 6

APPARATUS FOR THERMALLY PROCESSING FOOD PACKAGES COMPRISING PRODUCT CARRIERS WITH POSITIVE PACKAGE HANDLING

The present invention relates to an apparatus for thermally processing food products that have been packaged in sealed packages, in particular flexible packages like pouches.

Thermal processing apparatus are known in many variants. Each of them are designed to perform a thermal processing, which for example can be sterilization or pasteurization, in order to obtain increased shelf stability. For thermal processing of sealed flexible food packages, batch retort systems at present are mostly used. With this the flexible packages are being laid down on large square or rectangular product trays. These trays then are stacked to cubes and these cubes are then being placed inside of a static pressure vessel where they undergo a heat treatment. A well-known disadvantage hereof is the large difference in heat treatment that the food products inside the packages in the centre of the cubes undergo compared to the ones at the outside. This potentially leads to a loss of food product quality. Furthermore those batch retort systems are inefficient because of the multiple handling involved, and because of the discontinuous use of the vessel.

It is also known to perform a continuous thermal processing of such sealed flexible food packages. This offers major advantages regarding to energy efficiency, water consumption, floor space utilization and operator efficiency. For the continuous thermal processing it is required that the flexible food packages are first placed inside product carriers that are connected to an endless conveyor. The conveyor then, at a substantially continuous speed, transports the flexible food packages through various thermal processing stages, like preheating, sterilizing and cooling. Existing technology for placing the flexible food packages in the product carriers is often done by using intermediate product trays. With this the flexible food packages are first laid down on the intermediate product trays. Then in a next step those trays are placed into the product carriers. This existing technology however is inefficient because of the dual handling involved, one for filling of the product trays, and one for putting the product trays in the product carrier. Also they are not suitable for higher capacities of for example more than 250 flexible packages per minute.

EP 0 891 781 shows a hydrostatic continuous sterilizer with tower sections in which food pouches are directly placed in product carriers. An endless chain with those product carriers runs meandering through the tower sections. A first tower section comprises a heated water column for preheating the food pouches which have been placed inside the carriers. A last tower section comprises a cooled water column for cooling off the food pouches. The intermediate tower sections are filled with a high temperature damp phase for sterilizing the food pouches. The carriers of EP 0 891 781 are specifically designed with tapering compartments for being able to place the food pouches somewhat clamped therein. This is done in order to keep them supported from two sides in order to protect them during the sterilization. The tapering compartment walls are able to take up any forces which may get exerted on inner walls of the pouches when the food products start to expand during the sterilization. Thus it is tried to protect the food pouches against plastic deformations during the sterilization.

However, a disadvantage herewith is that the placing and removing of the food pouches into and out of the product carriers leaves to be desired. In EP 0 891 781 the food pouches need to be pushed with a sliding movement into the compartments. With this pushing the food pouches may get deformed somewhat. This can lead to a damaging of the food pouches and/or to a premature blocking of the food pouches before they have reached their end positions inside the tapering compartments. Also it may lead to local accumulations of the food products which may have a negative effect on the sterilization process. Also it is disadvantageous that the food pouches during their movements into and out of the compartments get to slide over and along the compartment walls. This is particularly disadvantageous because pouches are already known to be vulnerable to physical impacts such as pinching, puncturing, scratching, etc., and because recent trends and developments are directed towards even more fragile and vulnerable pouches. For example flexible packaging technology is continuously looking for opportunities to savings in raw materials and weight by creating solutions with thinner package walls, which have the additional advantage that it makes the food pouches even more suitable for thermal processing. For the sliding movements of the food pouches into and out of the tapered compartments of EP 0 891 781 such more fragile thinner walls are however prone to lead to damages. Next to this it is disadvantageous that in EP 0 891 781 it may be somewhat difficult to remove the thermally processed food pouches from out of the tapering compartments in the product carriers. With this the pouches also may get damaged. Finally in the industry it is considered best practice to compensate the pressure build up inside a package during pasteurisation or sterilization by applying an equal or higher external pressure and not to compensate by a mechanical limitation of the expansion. Apart from the risk of damaging the vulnerable package by mechanical limitation, also the physical contact between carrier and flexible package has a negative impact on the heat transfer properties from medium to food product of the system.

Another example of a hydrostatic continuous sterilizer with a conveyor chain to which a plurality of elongate carriers is connected is known from WO 88/04143. Each carrier comprises an upper and lower base wall, a rear wall and a rotatable front door. Partition walls are provided which divide the carrier in a row individual insertion spaces into which plastic bags to be treated can be placed.

Here substantially the same disadvantages go as have been mentioned above with respect to EP 0 891 781, that is to say that the placing and removing of the plastic bags into and out of the carriers leaves to be desired, and possibly may lead to the bags getting deformed, damaged or blocked.

The present invention aims to overcome the above disadvantages at least partly or to provide a usable alternative. In particular the invention aims to provide a user-friendly and reliable apparatus for thermally processing food packages with which the food packages can be positively handled during insertion into and/or removal out of a product carrier without running the risk of getting damaged and without negatively influencing the thermal processing.

This aim is achieved by an apparatus for thermally processing food products in sealed packages, in particular flexible food packages, according to claim 1. The apparatus comprises one or more heating and/or cooling chambers, an endless conveyor guided through the chambers, and a plurality of product carriers connected interspaced to the conveyor. Each carrier comprises at least a first row of insertion spaces for packages to be placed in. The insertion spaces each have an insertion opening and the first row of insertion spaces is at least partly delimited by a first side wall and an opposite second side wall. An inlet station is provided which comprises one or more first operating members which are operable to move in into and out of the insertion spaces for moving packages in an insertion direction into the insertion spaces. The conveyor is designed for transporting the carriers with packages placed in the insertion spaces thereof through the one or more heating and/or cooling chambers. The first side wall comprises at least one primary slit for each insertion space. This primary slit extends substantially in the insertion direction, and opens out towards the insertion opening of its respective insertion space. The first operating members comprise load bearing organs operable for picking up and carrying packages. The load bearing organ may be in the form of a downwardly depending bar, tube, pipe or other structural member. The load bearing organs extend at least partly substantially in a transverse direction relative to the side walls, and are movable back and forth in the insertion direction through the primary slits during placing of packages into the first row of insertion spaces.

Owing to the invention it is now truly possible to positively handle and position sealed food packages into product carriers of a thermal processing apparatus in such a way that a damaging of the packages can be prevented, while at the same time efficiency of loading and unloading operations can be optimized. A high capacity of thermal processing can thus be achieved. The invention allows for handling of each food package individually all the way to its final position in the product carrier without the use of gravity, and without a need for pushing, sliding, or dropping the food packages into or out of the product carriers. Tests have shown that when used for flexible food packages, the slits leave no permanent imprint or marking on the flexible food package after thermal processing. Advantageously, the slits allow for both vertical and horizontal loading and unloading, or any desired slanted position in between.

The load bearing organs for example may have operable holding means at their outer ends. It is noted though that such operable holding means may also be provided at other positions along the load bearing organs.

It is possible to provide the slits in only one side wall per row of insertion spaces. Advantageously however also the opposing side wall(s) can be provided with such slits. This makes it possible to more flexibly position the inlet station and/or an outlet station alongside the conveyor, because then they can reach the insertion spaces from two sides. For example for horizontal loading and unloading, the operating members with their load bearing organs or holding means then can be used both from below or from above. For example for vertical loading and unloading, the operating members with their load bearing organs or holding means then can be used both from the left or the right.

In a preferred embodiment each carrier further may comprise a second row of insertion spaces for packages to be placed in. This second row of insertion spaces then can be at least partly delimited by the second side wall and an opposite third side wall. The second side wall than may comprise at least one secondary slit for each insertion space of the second row of insertion spaces. Like the primary slit, this secondary slit then also extends substantially in the insertion direction, and opens out towards the insertion opening of the respective insertion space. The load bearing organs can now advantageously be made movable in the insertion direction while projecting through both the primary and secondary slits during placing of packages into the second row of insertion spaces. Thus the density of packages per carrier can be increased, while maintaining all the advantages of the positive handling of the packages at the inlet station. If desired the number of rows can be further enlarged. The loading process then needs to be a two step method. In a first step food packages need to be loaded into the second row of insertion spaces. In a second step food packages can then be loaded into the first row of insertion spaces.

In the alternative it is also possible to have the load bearing organ connected to a carrier that fits freely movable into and out of the insertion space of the first row while having the load bearing organ extend through the secondary slit. Thus it is also possible to move packages into and out of the second row of insertion spaces without the load bearing organs having to extend through both the primary and secondary slits. Also this advantageously makes it possible to have the first and second rows loaded with one and the same operating and load bearing member.

It is possible to also equip the third side wall with slits. Again this makes it possible to more flexibly position the inlet and/or outlet stations, and reach the two rows of insertion spaces from two sides. It however also makes it possible to load food packages into the respective first and second rows at a same time, one from the side of the first side wall and the other from the side of the third side wall. The intermediate second side wall then not even needs to be provided with the secondary slits.

In a further preferred embodiment each insertion space is not only delimited by the opposing side walls but also by two opposing partition walls which connect to the side walls. Thus each carrier gets to comprise one or more rows of distinctive pocket-like insertion spaces inside which the packages can be positively placed. The pocket-like insertion spaces make it easier to maintain optimal processing conditions during the thermal processing. For example it is easier to ensure maximum exposure to process medium all around the packages placed therein. It is possible to have only one or a multiple of food packages placed inside the pocket-like insertion spaces.

Preferably the pocket-like insertion spaces are designed to optimally correspond to the food package to be processed. With this the pocket-like insertion space preferably has a substantially rectangular shape inside which the food packages fit with a slight play all around, such that they do not have to lie against both opposite side walls at the same time. This makes it possible for the process medium to flow all around the food packages and exchange heat directly instead of indirectly via the carrier side walls. It has appeared that even with such play, sufficient physical support is given to the food package in critical areas during expansion from internal pressure build up during sterilization.

In order to further optimize the exposure to process medium a plurality of openings, in particular in the form of a hole pattern design, can be provided in the carrier walls. Particularly the compartment-like insertion spaces create a situation where the location of each package placed therein is exactly known, thus allowing for an optimized design via which the package can be brought into contact with the process medium. Preferably the carrier is made with a hole pattern in its walls. This makes it possible to further maximize the heat transfer between process medium and food product inside the package.

The load bearing organs and operable holding means can be of various types as long as they are designed for being able to positively carry the packages such that they can be placed more or less floating into the insertion space without the packages running the risk of bumping against or otherwise getting in contact with the carrier side walls. In a preferred embodiment the load bearing organs are vacuum bars and the operable holding means are suction heads together forming part of a vacuum system. In particular for flexible food packages this has appeared to be an optimal manner of picking up and placing which is well able to adapt to all kinds of different shapes and does not damage the flexible food packages in any way. Per package one or more suction heads can be used. Typically 2 to 6 suction cups are used to pick up and manipulate a single food package.

Once being thermally processed in the heating and/or cooling chambers, the packages can be taken out of the product carriers in different ways, for example by means of gravity. Preferably, however an outlet station is provided which largely resembles the inlet station, that is to say that the outlet station can be equipped with one or more second operating members which are operable to move into and out of the insertion spaces for moving packages in the insertion direction out of the insertion spaces. The second operating members then again may comprise load bearing organs operable for picking up and carrying food packages, for example load bearing organs having operable holding means at their outer ends, which load bearing organs extend substantially in a transverse direction relative to the side walls, and which load bearing organs are movable in the insertion direction while projecting through the primary slits during picking of packages out of the first row of insertion spaces.

The slits can have all kinds of shapes, and for example be formed by U-shaped cut-outs. The slits may have a maximum width of 50 mm, in particular about 30 mm. This prevents the food packages from sagging through the slits, whereas the load bearing organs are well able to move back and forth there through. The slits may extend over the entire height of the side walls. Preferably however they end interspaced from bottom walls which may be provided to delimit lower sides of the insertion spaces, in particular interspaced at distances of at least 10 mm. This helps to strengthen the carriers and helps to prevent the operating members and/or the food packages to bump against the bottom wall during placing.

For handling of large size flexible packages two or multiple adjacent slits can be used per package.

In a variant the operating member may comprise at least two sets of load bearing organs for simultaneously picking up and carrying at least two sets of the packages into or out of carriers, in particular out of adjacent carriers. Thus the operating member can operate more efficiently, while at the same time space may be saved.

In a further embodiment the operating member may comprise a multiple-rod mechanism with the at least two sets of load bearing organs being connected to at least two rods thereof. The multiple-rod mechanism can advantageously be operated to perform a combined translational and rotational movement between a position in which the two sets of packages lie above each other, towards a position in which the two sets lie behind each other, and vice versa.

In a further embodiment the multiple-rod mechanism, in particular formed by a four-bar linkage mechanism, may comprise a main rod and an auxiliary rod. The auxiliary rod then can be hingedly connected by two transverse rods to the main rod, whereas one set of the load bearing organs gets connected to the main rod, and whereas another set of the load bearing organs gets connected to the auxiliary rod. This makes it possible to on the one hand combine translational movements for the two sets of load bearing organs, whereas on the other hand their relative positioning can be changed.

For this changing of the relative positioning of the sets of load bearing organs, one of the hinge connections between the rods may comprise a drive unit. This drive unit then is able to rotate the transverse rods relative to the main and auxiliary rod and thus change the relative positioning.

In an another embodiment third operating members can be provided for taking over packages from or giving packages to the abovementioned first or second operating members. This may help to make the picking and placing of the packages into desired insertion directions and/or onto desired supporting surfaces of for example conveyors or storage spaces more flexible.

The insertion direction preferably extends substantially parallel to the side walls.

Further preferred embodiments are stated in the subclaims.

The invention also relates to a carrier for carrying food products in sealed packages through an apparatus for thermally processing the food products in particular through the claimed apparatus, and to a method for operating the claimed apparatus.

The invention shall be explained in more detail below with reference to the accompanying drawings, in which.

Figure 1:
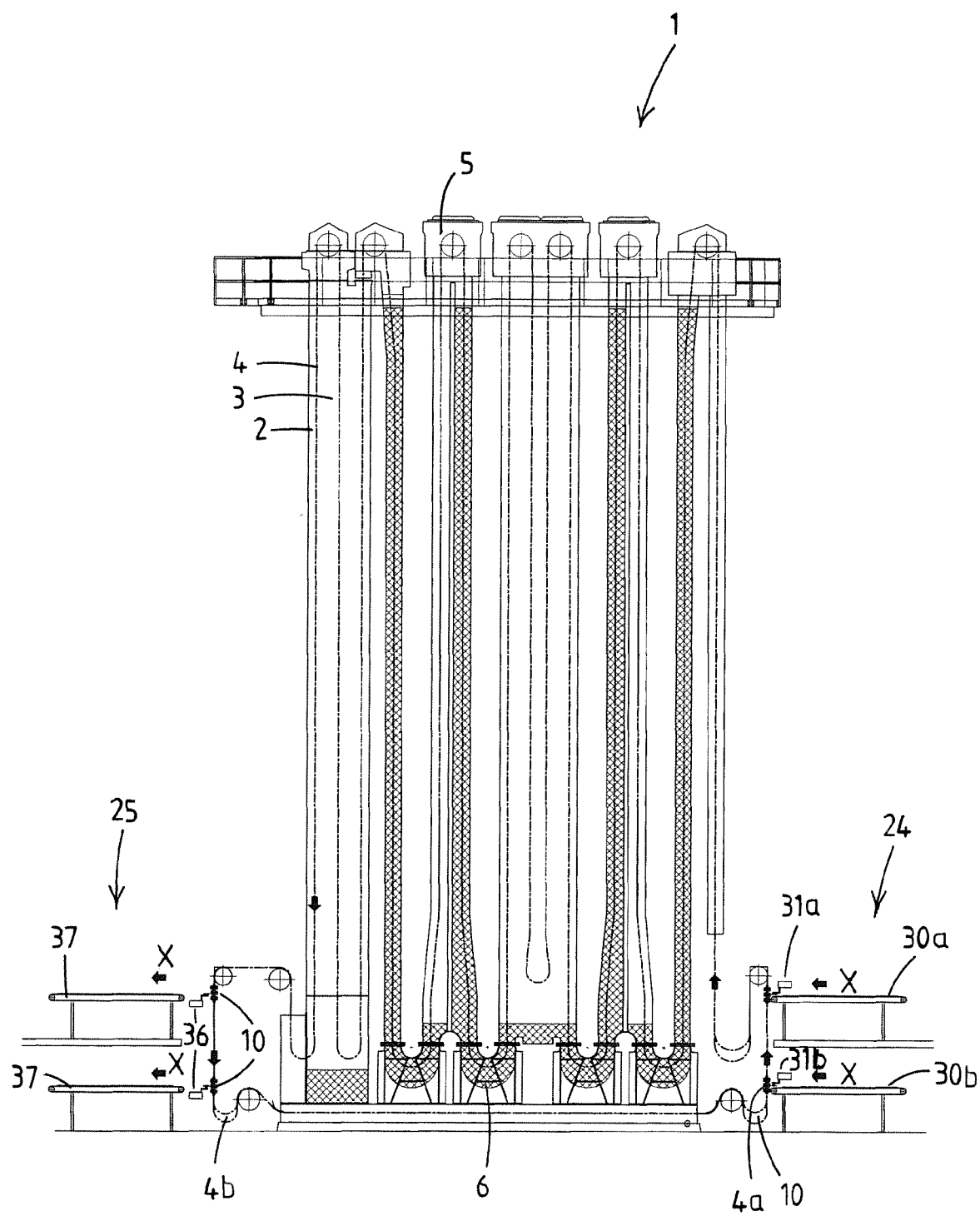
FIG. 1 shows a schematic view of a hydrostatic continuous sterilizer apparatus with vertically orientated tower sections according to the invention.
Figure 2:
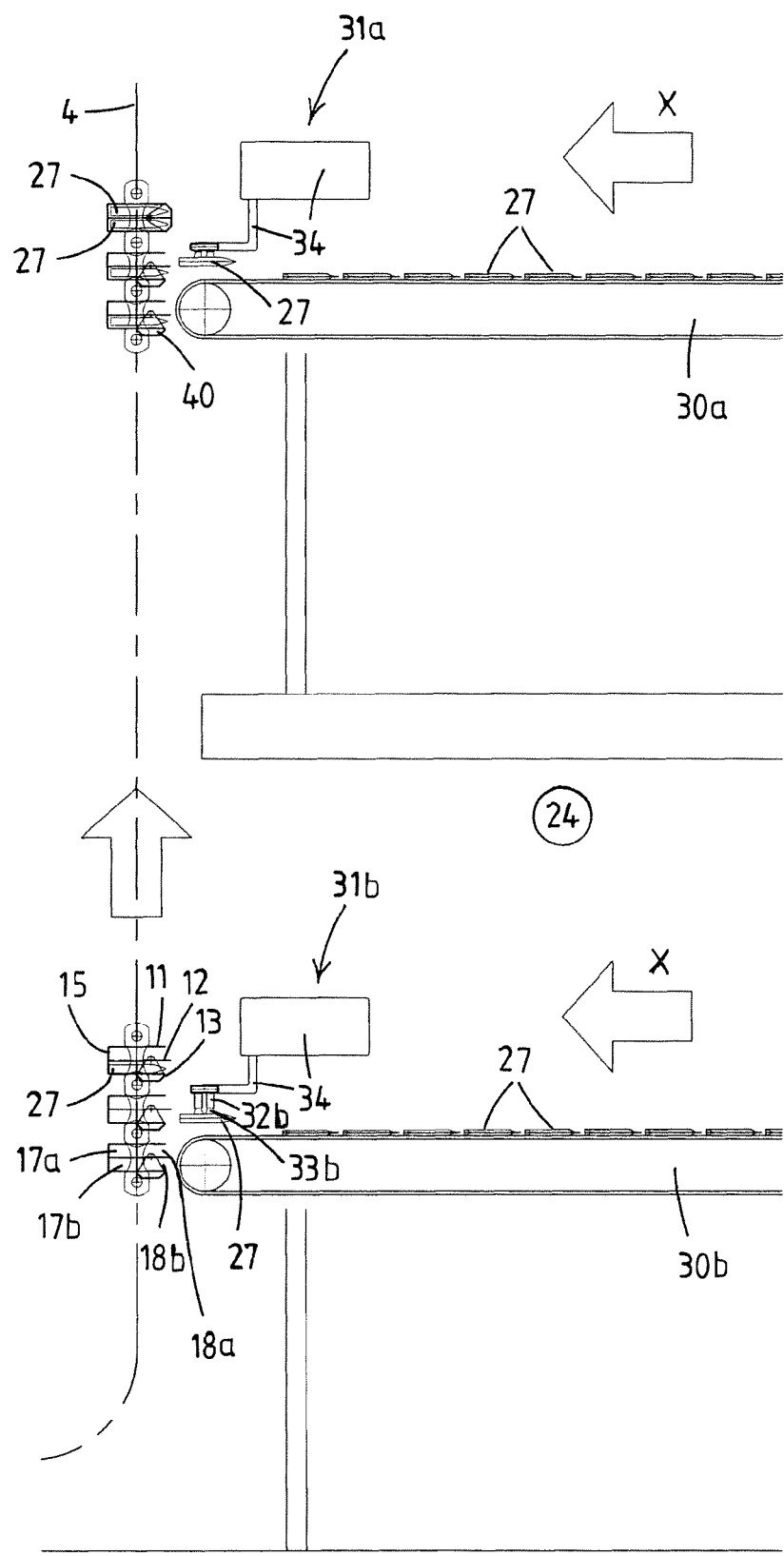
FIG. 2 shows an enlarged partial view of the inlet station of FIG. 1.
Figure 4B:
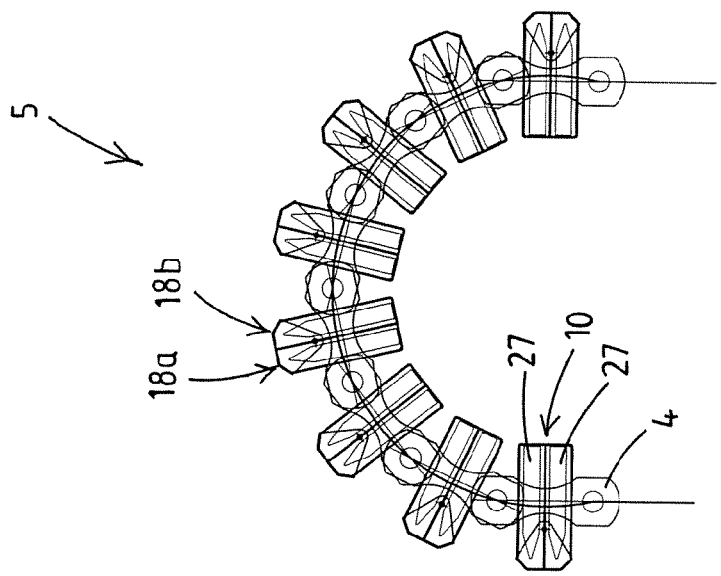
Figure 4A:
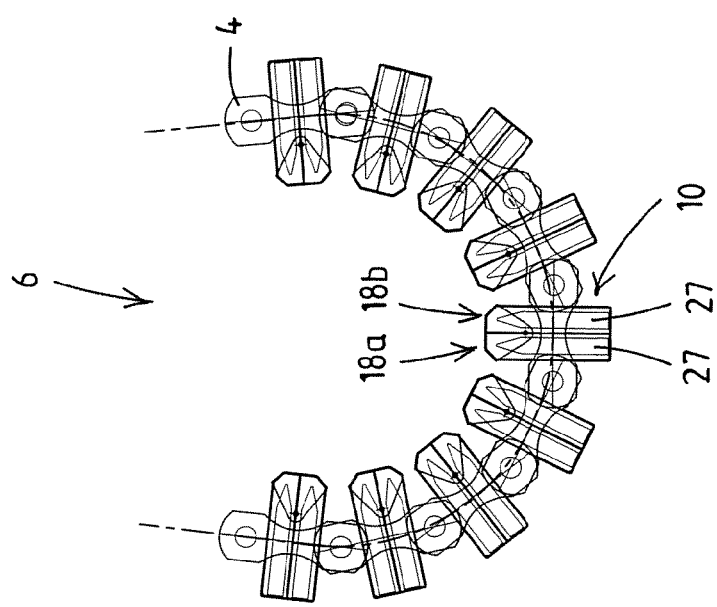
Figure 5B:
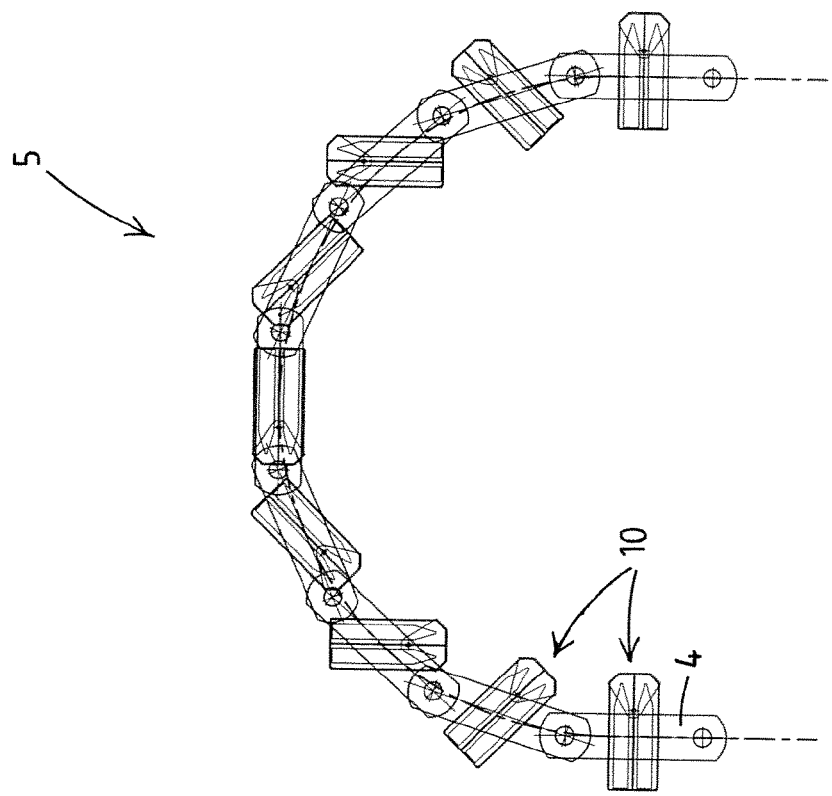
Figure 5A:
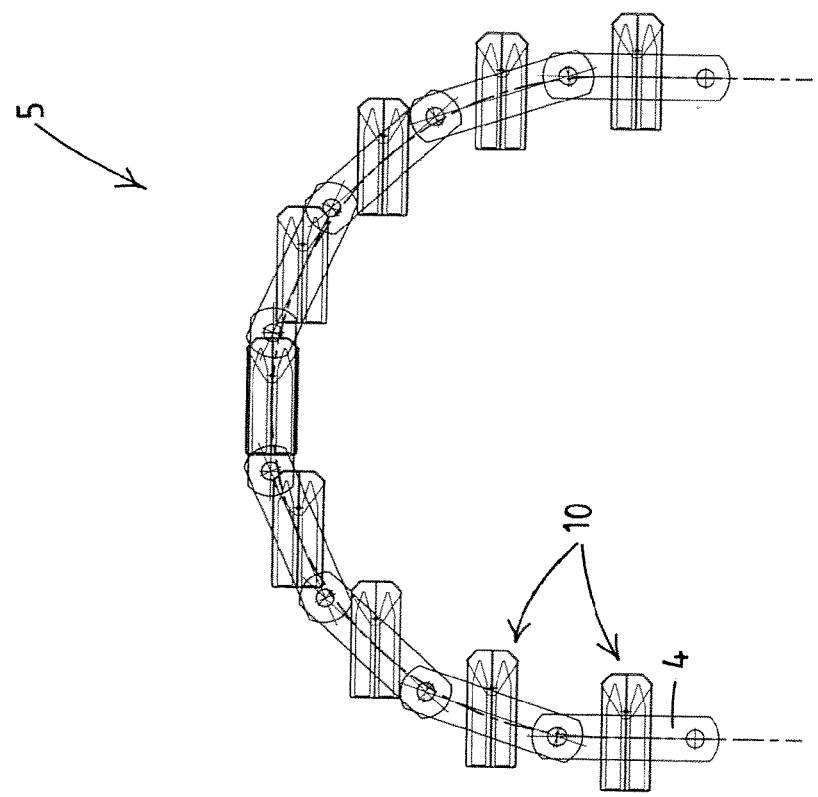
Figure 6:
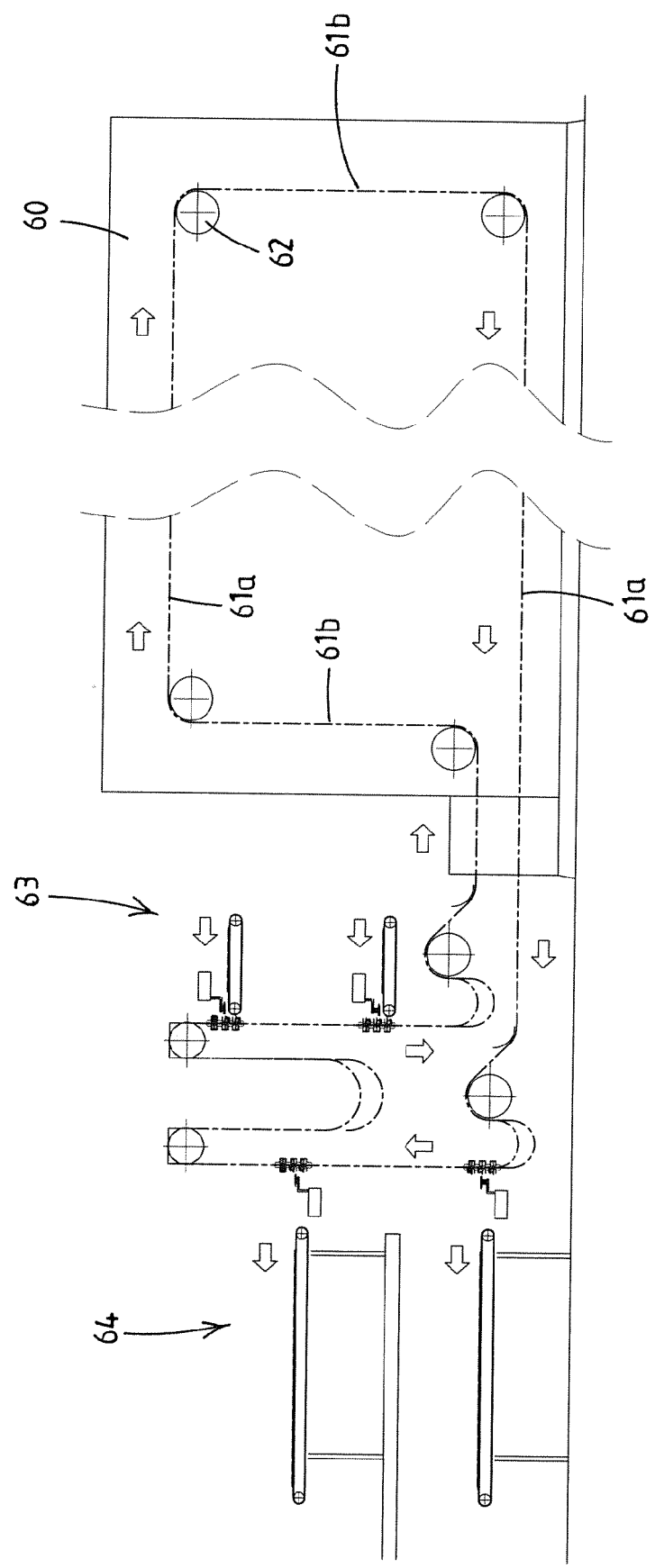
Figure 7A:
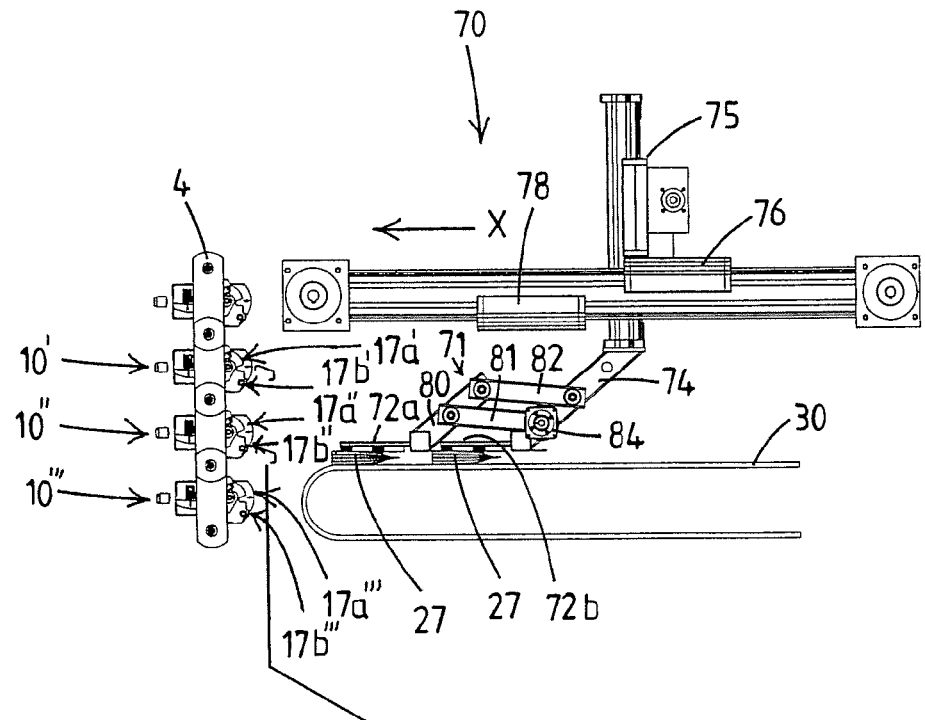
Figure 7B:
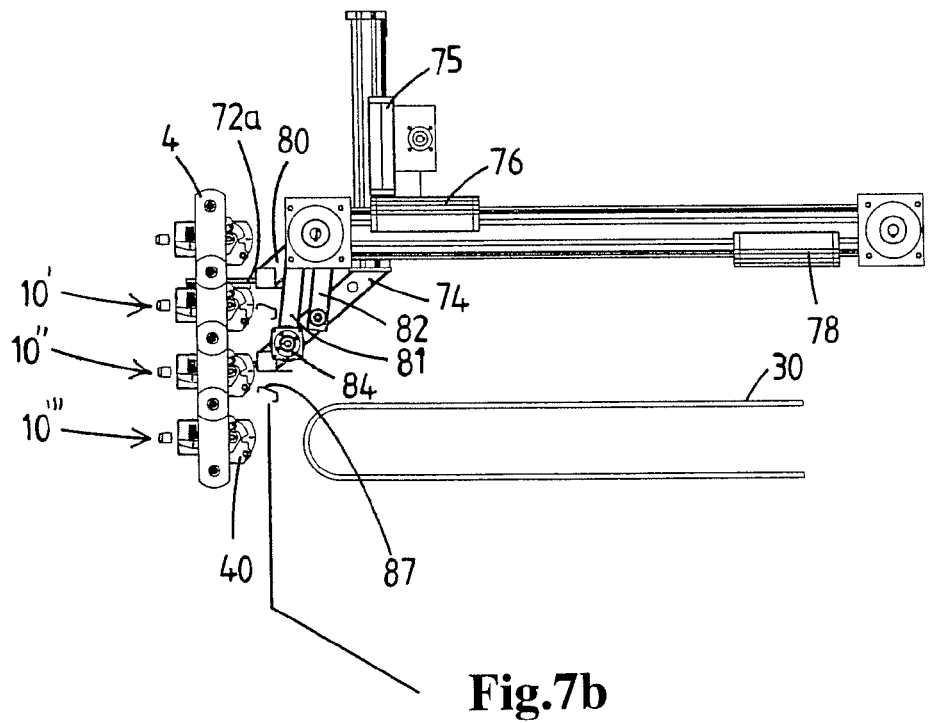
Figure 8:
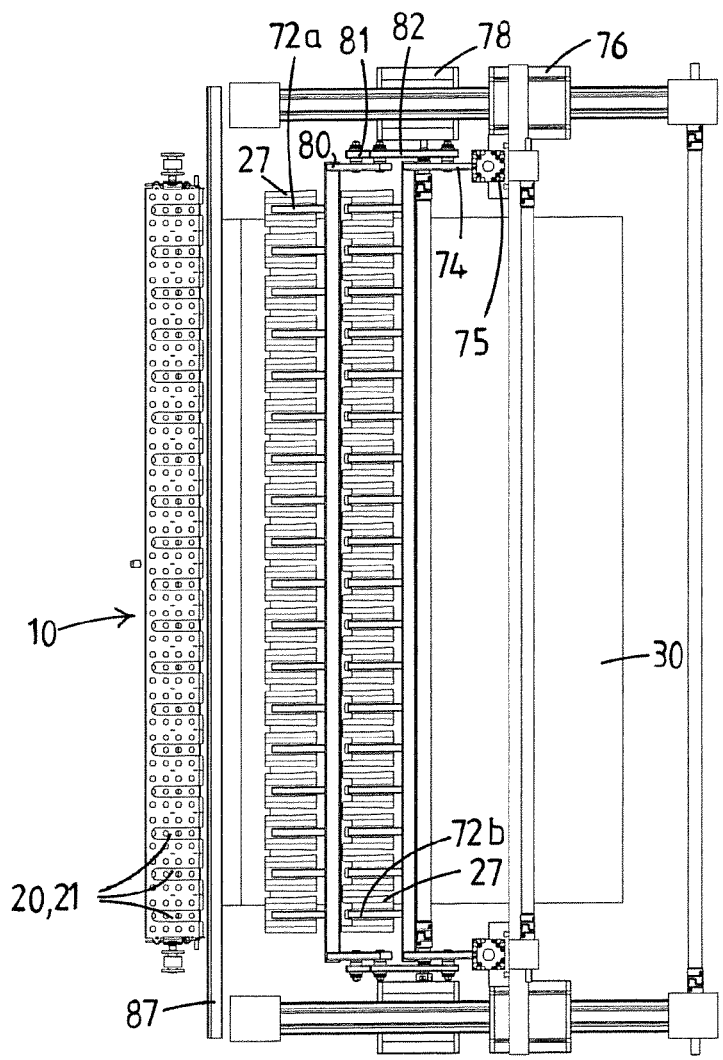
Figure 9:
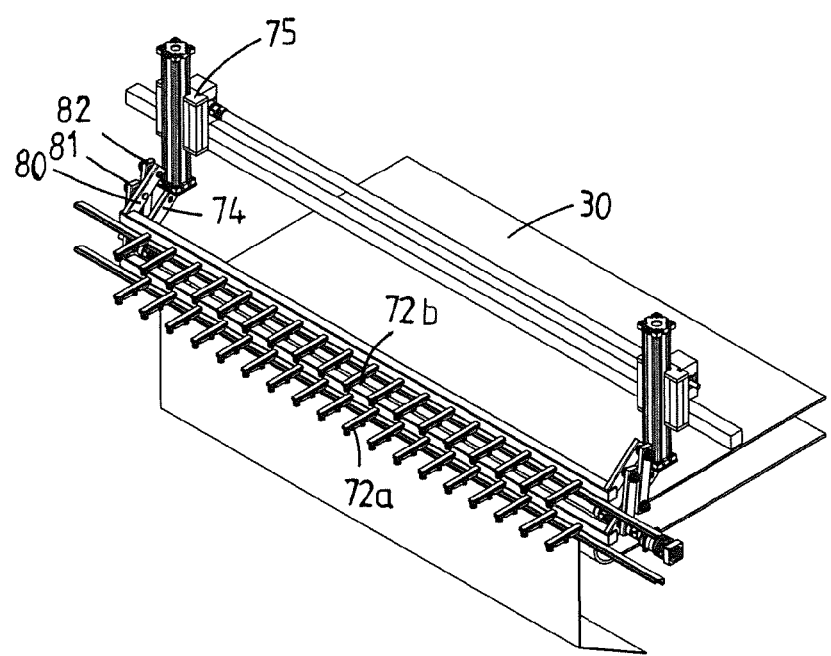
Figure 10A:
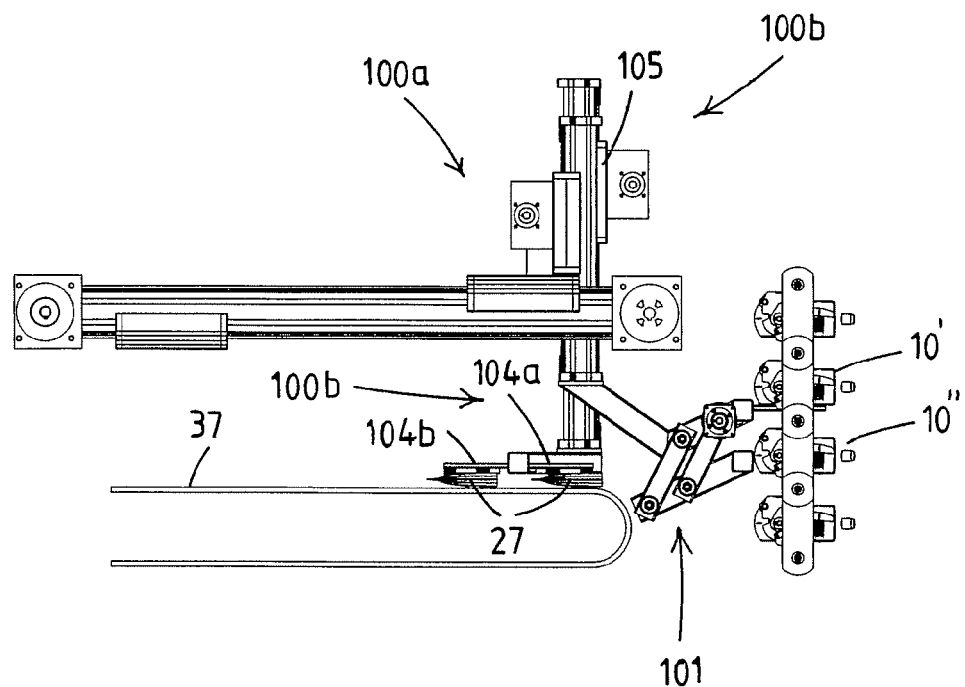
Figure 10B:
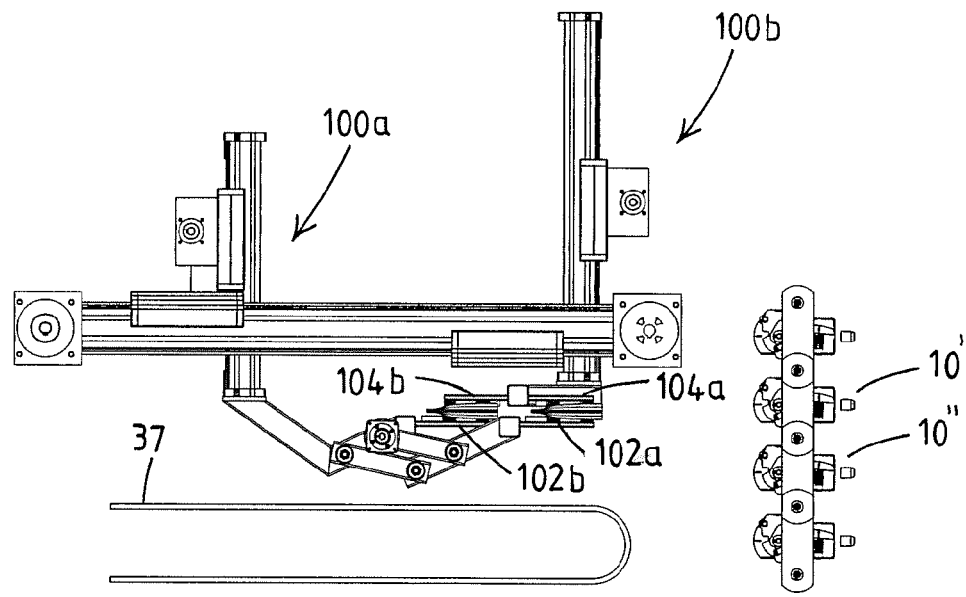
Figure 11:
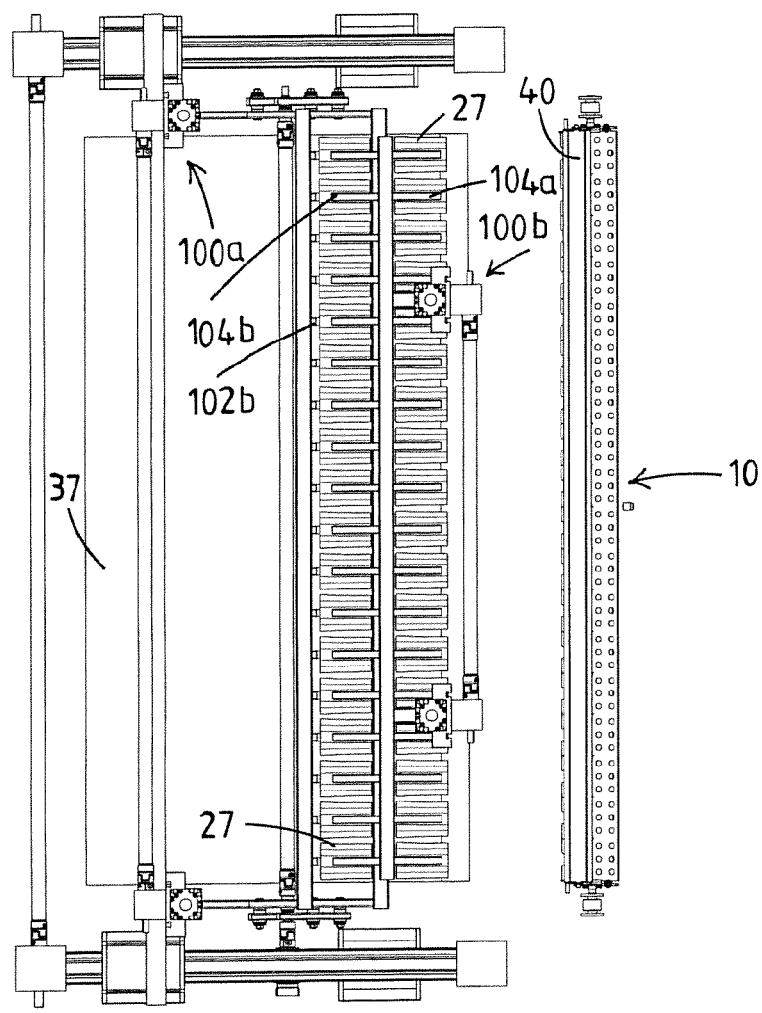

FIG. 3a-f show enlarged perspective views of the carrier of FIG. 2 during respective loading steps;

FIG. 4a-b show a positioning of the carriers when transported along U-turn sections of the apparatus of FIG. 1, with the carriers being non-rotatably connected to the conveyor;

FIG. 5a-b are views according to FIG. 4b with the carriers being rotatably connected to the conveyor;

FIG. 6 is a view according to FIG. 1 of a variant with horizontally orientated track sections;

FIG. 7a-b show side views of two respective loading steps with a variant embodiment for the inlet station;

FIG. 8 shows a top view of FIG. 7a;

FIG. 9 shows a perspective view of the inlet station of FIG. 7b in which the pouches and the carriers are not shown;

FIG. 10a-b show side views of two respective unloading steps with a variant embodiment of an operating member for the outlet station;

FIG. 11 shows a top view of FIG. 10b; and

Figure 12:
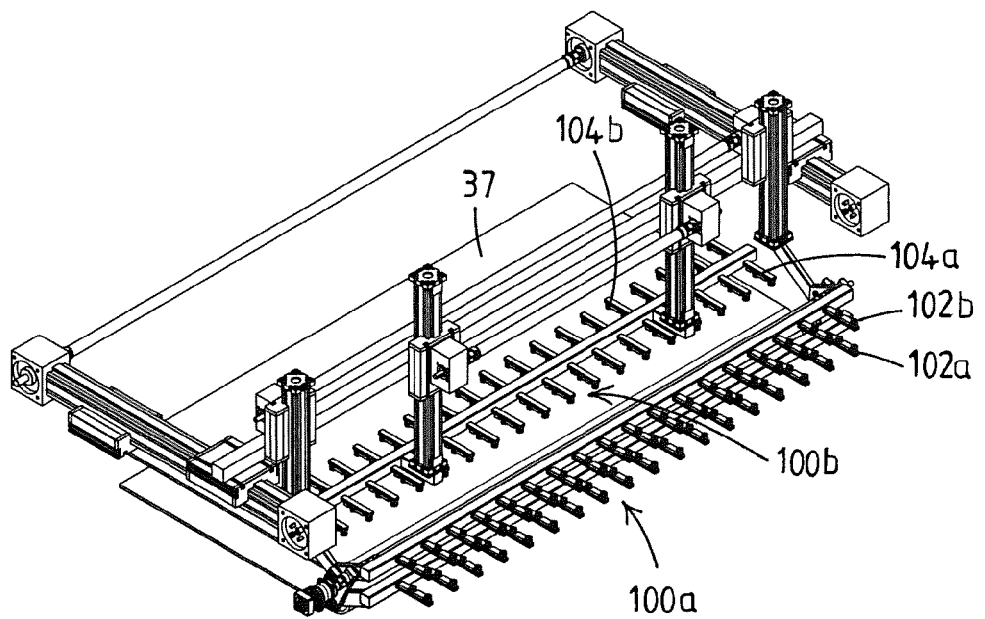

FIG. 12 shows a perspective view of the inlet station of FIG. 10a in which the pouches and the carriers are not shown.

In FIG. 1 the sterilizer apparatus in its entirety has been given the reference numeral 1. The apparatus 1 comprises a number of tower sections 2 which are placed adjacent to each other. The tower sections 2 are filled with heated or cooled process media and form heating and cooling chambers 3. Some of the tower sections 2 are filled with fluid columns such that an increased pressure can be obtained with high temperature damp phases in adjacent tower sections 2. An endless conveyor 4, which here is formed by two interspaced endless chains, runs meandering with partly straight, vertically orientated track sections through the respective chambers 3. The tower sections 2 are connected to each other by means of upper and lower U-turn sections 5, 6. Guiding wheels 7 are provided in the upper U-turn sections 5 for guiding the conveyor 4 along. In the lower U-turn sections 6 no guiding wheels are provided. There the conveyor 4 can be moved as free hanging loops.

Elongated stainless steel product carriers 10 are fixedly connected to the chains of the conveyor 4. See FIG. 2-4. As can particularly be seen in FIG. 3, each carrier 10 comprises an outer first side wall 11, an intermediate second side wall 12 and an outer third side wall 12 which extend parallel to each other in a horizontal direction. Partition walls 14 extend in a vertical direction in between the side walls 11, 12, 13. Furthermore a bottom wall 15 is provided which extends in a horizontal direction. Together the side walls 11, 12, 13, the partition walls 14 and the bottom wall 15 delimit a first and second row of rectangular pocket-like insertion spaces 17a, 17b. Each insertion space 17a, 17b has an insertion opening 18a, 18b opposite the bottom wall 15.

According to the invention the first and second side walls 11, 12 are provided with primary and secondary slits 20, 21, which here are formed as U-shaped cut-outs. The slits 20, 21 open out towards the insertion openings 18 and extend in a so-called insertion direction X towards the bottom wall 15.

An inlet station 24 is positioned at a right side of the apparatus 1. An outlet station 25 is positioned at a left side of the apparatus 1.

During use the conveyor 4 gets driven to transport the carriers 10 at a substantially constant speed through the respective chambers 3 from the inlet station 24 towards the outlet station 25. At the positions of the stations 24, 25 the carriers 10 can temporarily be held at a stand still such that flexible food packages 27 can be placed in or taken out of the insertion spaces 17. In order to be able to obtain this intermittent transport of the carriers 10 past by the stations 24, 25, the conveyor 4 has the freedom to form bigger or smaller free hanging loops 4a, 4b in front of the stations 24, 25.

The inlet station 24 is provided with a conveyor belt 30a for moving the flexible food packages 27 towards the first row of insertion spaces 17a of a carrier 10 which has been stopped in front of it, and a conveyor belt 30b for at a same time moving the flexible food packages 27 towards the second row of insertion spaces 17b of another carrier 10 which has been stopped in front of it.

At the ends of the belts 30a, 30b, first operating members 31a, 31b are provided. Each operating member 31 comprises two vacuum bars 32 forming portions of a load bearing organ or element at the end of which suction heads 33 are provided. The assemblies of the vacuum bars 32 and suction heads 33 can be moved back and forth in the insertion direction X, which here is horizontally directed, into and out of the insertion spaces 17. For this operable translation means 34 are provided. When operated, the suction heads 33 are able to pick up the flexible food packages 27 from the respective belts 30 and then carry them freely floating into the respective rows of insertion spaces 17. During this movement the vacuum bars 32 get to project through the slits 20, 21 of the carrier 10 that gets loaded.

As can be seen in FIG. 1, 2 the vacuum bars 32b are dimensioned prolonged relative to the vacuum bars 32a. This makes it possible for the vacuum bars 32b to project not only through the slits 20 in the upper first side wall 11, but also through the slits 21 in the intermediate second side wall 12, during placing of packages 27 into the second row of insertion spaces 17b. The vacuum bars 32a only need to project through the slits 20 in the upper first side wall 11 during placing of packages 27 into the first row of insertion spaces 17a, and therefore can be dimensioned shorter.

Figure 3A:
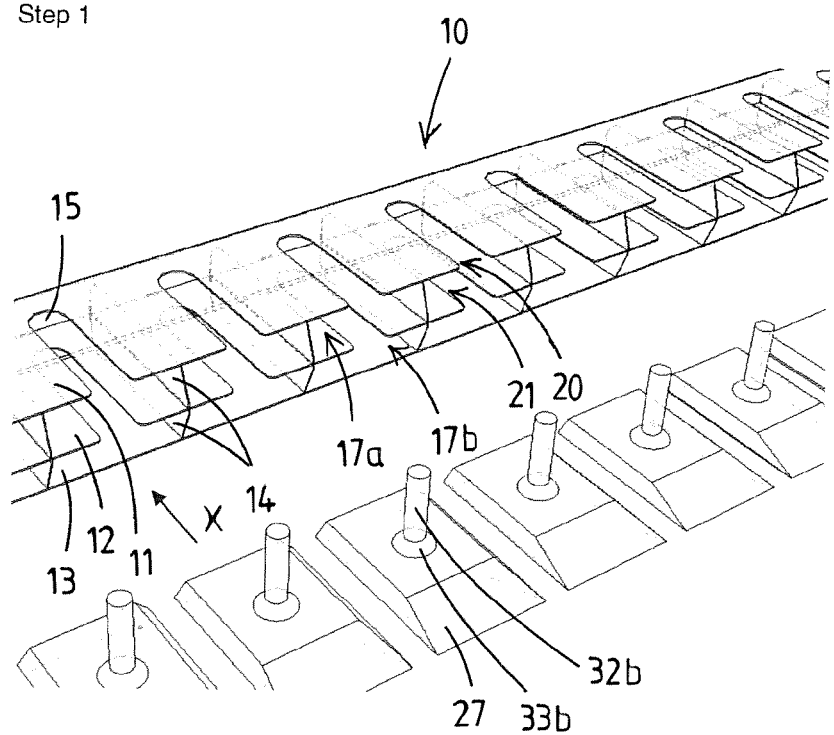
Figure 3B:
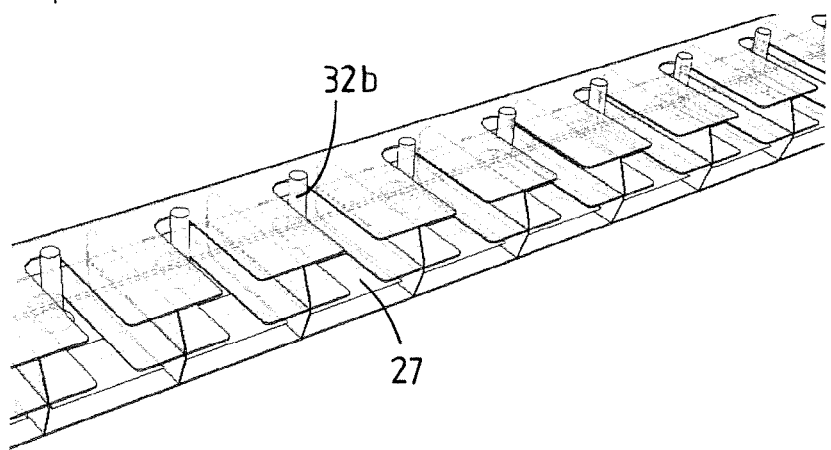
Figure 3C:
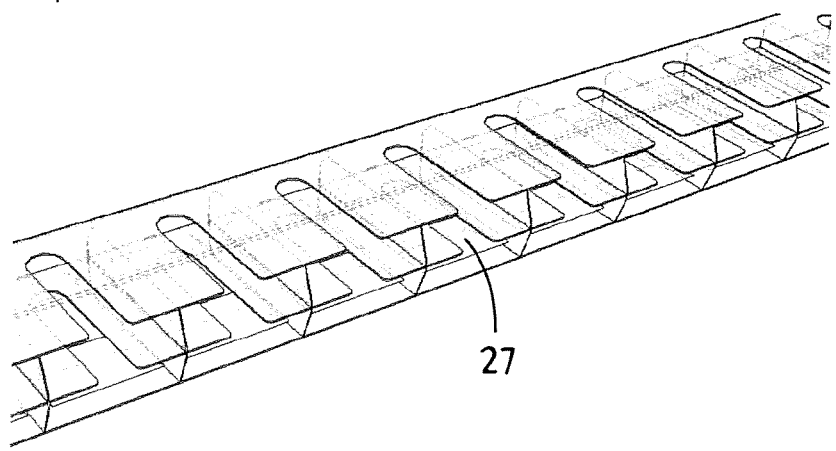
Figure 3D:
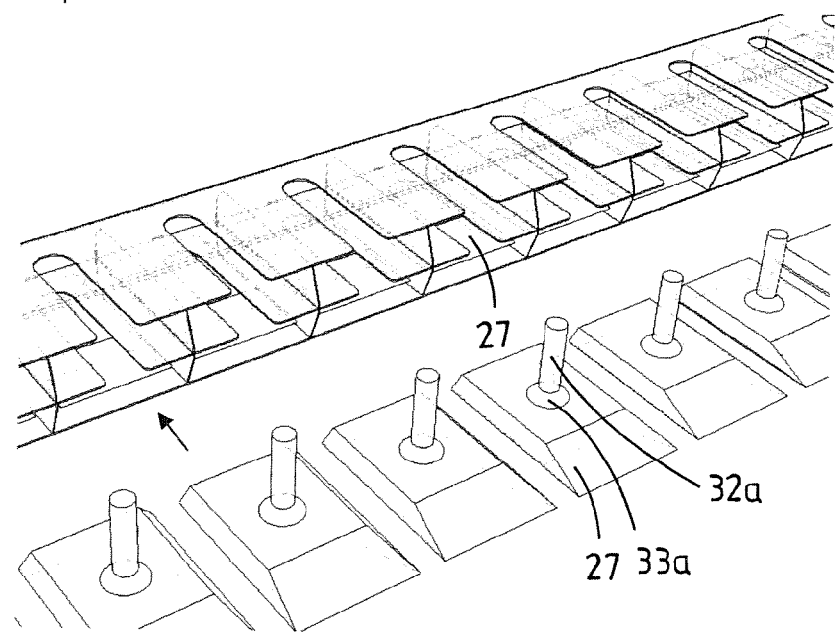
Figure 3E:
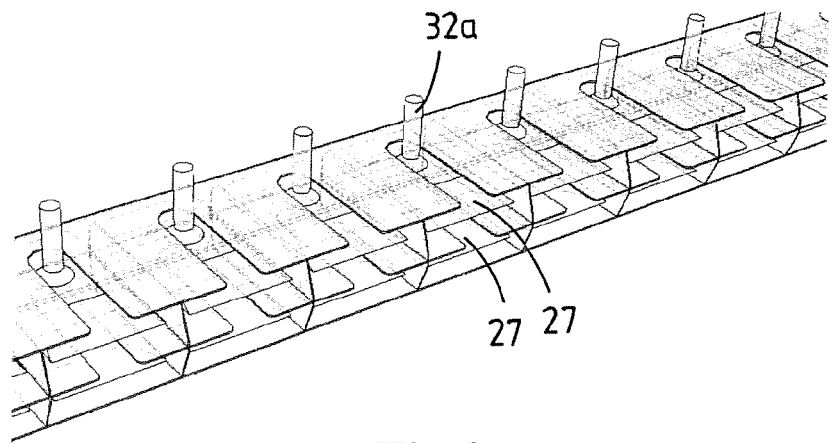
Figure 3F:
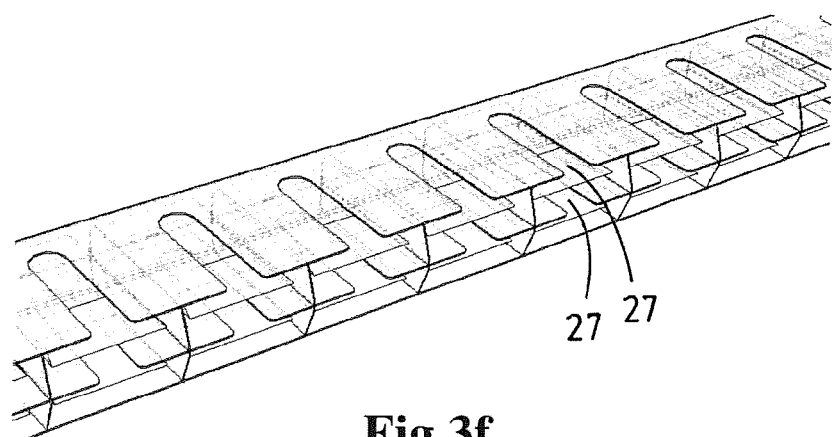

During loading a respective carrier 10 first gets stopped in front of the belt 30b and operating members 31b. Packages 27 can then be carefully picked up and placed in the second insertion spaces 17b (FIG. 3a-c). Subsequently the respective carrier 10 can get transported towards and stopped in front of the belt 30a and operating members 31a. Packages 27 can then be carefully picked up and placed in the first insertion spaces 17a (FIG. 3d-f). Thus an efficient two-step loading method is possible.

After being sterilized inside the chambers 3 the thermally processed packages 27 in a similar manner can be unloaded from the carriers 10 again at the outlet station 25. Owing to the fixed connection of the carriers 10 to the conveyor 4, the carriers 10 get stopped in front of the outlet station 25 turned upside down, that is to say with their slits 20, 21 at lower sides of the carriers 10. Therefore, at the outlet station 25 a double set of second operating members 36 is provided which have their vacuum bars and suction heads project upwards (instead of downwards as is the case at the inlet station 24). In this way they are able to connect to the packages 27 lying in the carriers 10 and then carefully move them out of there and place them on top of conveyor belts 37. The unloading here is performed as an efficient two-step unloading method in which first the packages are taken out of the first row of insertion spaces and subsequently out of the second row of insertion spaces.

It is noted that owing to the fixed connection of the carriers 10 to the conveyor 4, the carriers 10 actively co-rotate together with the chain links when passing by the U-turn sections 5, 6. See also FIG. 4a-b. Thus the packages 27 placed inside the carriers 10 advantageously get mildly agitated during the sterilization.

In a variant it is also possible to connect the carriers 10 rotatably to the conveyor 4. This makes it possible for the carriers 10 to substantially maintain their positions relative to the conveyor 4 throughout their entire transport through the chambers 3 even when they pass by the U-turn sections 5, 6.

FIG. 5a shows a variant of such a rotatable connection in which the carriers 10 have the full freedom to maintain a certain positioning, in this case a horizontal positioning, relative to the horizontal during their passing of the U-turn section 5.

FIG. 5b shows a variant of such a rotatable connection in which the carriers 10 can be actively given an aimed rotational movement. Rotational movement then can be obtained by means of a driven rotation chain. Each carrier 10 then can be provided with a chain wheel which grips into this rotation chain. The swinging movements can be seen in the number of differing positions which are shown for the respective carriers 10 when passing the U-turn section 5. In addition or in the alternative it is also possible to give the carriers the aimed rotational movement when they move along the straight track sections. Thus the packages 27 placed inside the carriers 10 advantageously can get actively rotated and thus can get agitated during the sterilization.

Further it is noted that each of the carriers can be provided with a closable hatch 40. This hatch 40 can be hingedly connected to the carrier 10 and can be automatically opened and closed before and after the stations 24, 25. The hatches 40 may help to prevent the packages 27 from starting to float out of the carriers 10 when transported through those tower sections 2 that are filled with fluid columns. Also these hatches 40 make it possible for the carriers 10 to get actively rotated even such that the insertion openings 18a, 18b may temporarily get directed downwards. This is shown in FIG. 5b.

FIG. 6 shows a variant in which only one heating and/or cooling chamber 60 is provided. An endless conveyor 61 runs with horizontally and vertically orientated tracks 61a respectively 61b through the chamber 60 and is guided over a plurality of guiding wheels 62. Outside the chamber 60, inlet and outlet stations 63, 64 are provided. In this case the inlet and outlet stations 63, 64 are positioned at a same side of the chamber 60. For this variant also an advantageous use can be made of the inventive carriers which are provided with slits such that load bearing organs; for example, vacuum bars 32a, 32b, are able to freely move back and forth there through during loading and/or unloading of the carriers at the inlet and outlet stations 63, 64.

In FIG. 7-9 a variant is shown for the inlet station, in which similar parts have been given the same reference numerals as in the previous drawings. In this variant a first operating member 70 is designed such that it can pick up two sets of flexible food packages 27 lying behind each other at a same time from a conveyor belt 30 (FIG. 7a). Subsequently the operating member 70 can be operated to place the first set of packages 27 inside a first upper row of insertion spaces 17a' from a carrier 10', whereas the second set of packages 27 at the same time gets placed inside a second lower row of insertion spaces 17b" of a following carrier 10" (FIG. 7b) that lies underneath the carrier 10'.

Subsequently the conveyor 4 (only part of which is shown) to which the carriers 10 are connected, is controlled to make an indexed movement and moves the carriers 10, that are positioned in front of the inlet station, one pitch forward. The operating member 70 then gets operated to pick up two new sets of flexible food packages 27 from the conveyor belt 30, after which it places the first set inside a first row of insertion spaces 17a" from the carrier 10", whereas the second set at the same time gets placed inside a second row of insertion spaces 17b''' of a next carrier 10'''. Thus also a two-step loading method is possible while only one conveyor belt 30 is necessary. This reduces cost and saves space.

For being able to do this, the operating member 70 comprises a piston-cylinder operated multiple-rod mechanism 71 (four-bar linkage mechanism) with two sets of load bearing organs and holding means or assembly 72a, 72b, that can be operated between a picking position (FIG. 7a) in which the two sets lie behind each other, towards a placing position (FIG. 7b) in which the two sets lie above each other.

The multiple-rod mechanism 71 comprises a main or control rod or link 74 that can be moved up and down by an operable first piston-cylinder 75, and back and forth in the insertion direction X by an operable second piston-cylinder 76.

In order to keep the system balanced during quick loading movements, a counterweight 78 is provided that moves counter to the second piston-cylinder 76 during its back and forth movements in the insertion direction X.

An auxiliary or slave rod or link 80 is hingedly connected by means of two transverse rods 81, 82 to the main rod 74. The front set of load bearing organs with holding means 72a is connected to a lower end of the auxiliary rod 80. The back set of load bearing organs with holding means 72b is connected to a lower end of the main rod 74.

One of the four hinge connections between the rods 74, 80, 81, 82 comprises a drive unit 84 for being able to controllably rotate the transverse rods 81, 82 towards other angular positions relative to the main and auxiliary rod 74, 80. Because of this, the auxiliary rod 80 moves together with its front set of load bearing organs with holding means from its picking position (FIG. 7a) towards its placing position (FIG. 7b). The operating member 70 together with its multiple-rod mechanism 71 thus is able to perform rotational and translational movements with the packages its picks up in such a way that any accelerations on the packages 27 are kept balanced with holding forces of its holding means onto the packages 27.

The load bearing organs with holding means 72 here comprise vacuum bars with suction heads. When operated, the holding means are well able to pick up the flexible food packages 27 from the belt 30 and then carry them freely floating into the respective rows of insertion spaces 17 of carrier 10. During this movement, the vacuum bars 32 engage through slits 20, 21 of the carrier 10 being loaded.

As can be seen in FIG. 7b each load bearing organ with holding means 72 is connected to a horizontally projecting stave that is designed such slender that, if a lower insertion space 17b needs to be loaded with a package 27, the stave is freely movable into and out of the then still empty insertion space 17a while having the load bearing organ extend through the slit 21 in the intermediate side wall between the insertion spaces 17a, 17b. Thus the two sets of load bearing organs with holding means can be dimensioned the same, because the load bearing organs of both sets 72a, 72b can be made with equal lengths. Both sets of load bearing organs thus are able to either load a package 27 into an upper insertions pace 17a or into a lower insertion space 17b, depending on the stage of the loading and positioning of the carriers 10 in front of them.

The inlet station includes two guiding plates 87 that are positioned directly in front of the aimed stopping positions of the carriers 10. Those guiding plates 87 serve the purpose of preventing a package 27 from becoming stuck behind projecting parts of the carriers 10, for example, hatches 40 that have gotten hinged downwards into their open positions at the location of the inlet station.

In FIG. 10-12 a variant is shown for the outlet station, in which similar parts have been given the same reference numerals as in the previous drawings. In this variant two operating members 100 together are designed such that a second operating member 100a can pick up two sets of flexible food packages 27 lying inside respective insertion spaces of carriers 10 (FIG. 10a), and then have them taken over by a third operating member 100b which places them behind each other onto a conveyor belt 37 (FIG. 10b).

With this the second operating member 100 largely resembles the first operating member 70 at the inlet station, that is to say that it comprises a multiple-rod mechanism that can be operated to pick a first set of packages 27 out of a row of insertion spaces 17' from a carrier 10', whereas a second set of packages 27 at the same time gets picked out of a row of insertion spaces 17" of a following carrier 10" that lies underneath the carrier 10'. The difference now is that the carriers 10 are positioned upside down with the slits 20, 21 at lower sides of the insertion spaces 17.

The second operating member 100a comprises a piston-cylinder operated multiple-rod mechanism (four-bar linkage mechanism) 101 with two sets of load bearing organs and holding means 102a, 102b, that can be operated to perform a combined translational and rotational movement between a picking position (FIG. 10a) in which the two sets lie above each other, towards a placing position (FIG. 10b) in which the two sets lie behind each other. The holding means of the first operating member 100a here are provided on top of the load bearing organs.

The third operating member 100b also comprises two sets of load bearing organs with holding means 104a, 104b. The holding means of this third operating member 100a are provided below its load bearing organs. Further the third operating member 100b comprises an operable piston-cylinder 105 for having the sets 104a, 104b perform up and down movements towards and away from the conveyor 37.

As can be seen in FIG. 10b the second operating member 100a, after having picked up the packages 27 is able to move them to a position directly underneath the sets of the load bearing organs and holding means 104a, 104b of the third operating member 100b. Suitable operation of the holding means of the respective sets 102, 104 then can cause the packages 27 to be taken over by the third operating member 101b from the second operating member 101a (FIG. 10b). Subsequently the second operating member 101a can be controlled to move out of the way towards its picking position as shown in FIG. 10a for picking out new sets of packages 27 out of the carriers 10, while the third operating member 101b gets controlled to place its sets of packages 27 on top of the conveyor 37 as also is shown in FIG. 10a. Thus a two-step unloading method is possible while only one conveyor belt 37 is necessary, again reducing cost and saving space.

Besides the embodiments shown numerous variants are possible. For example the shapes and dimensions of the carriers, slits and the like can be varied. Instead of being used for sterilization purposes it is also possible to use the carriers for other types of thermal processing, like pasteurization. Besides being driven at a constant speed, it is also possible to have the conveyor driven intermittently. It is also possible to provide each of the insertion spaces with two or more slits such that it also gets possible to load and unload larger dimensioned flexible packages therein by means of a corresponding number of adjacent operating members. Besides flexible packages it is also possible to treat other types of packages inside the apparatus. Also, the operating members can operate by other than a vacuum system, including, for example, mechanically grasping the packages 27.

Thus the invention provides an advantageous carrier design which in particular can be used in an efficient manner for sterilization of vulnerable flexible packages in a hydrostatic continuous sterilizer. High capacities of more than 1000 packages/minute have appeared possible with this.

The embodiments of the invention in which an exclusive property or privilege is claimed are defined as follows:

1. An apparatus for thermally processing food products in flexible packages, comprising:
   a. one or more processing stations;
   b. an endless conveyor guided to the processing stations;
   c. a plurality of food product carriers connected interspaced to the conveyor, in which each food product carrier comprises at least a first row of divided individual insertion spaces extending along the length of the product carrier for flexible food product packages to be placed into and removed from, the first row of insertion spaces is at least partly delimited by a longitudinal first side wall and an opposite longitudinal second side wall spaced apart from each other to define insertion openings leading into the insertion spaces, wherein insertion of flexible food packages into the individual insertion spaces and removal of the flexible food packages from the individual insertion spaces is through the insertion openings in the direction disposed transversely to the lengths of the first and second longitudinal side walls;
   d. an inlet and outlet station comprising one or more first operating members operable to move relative to the insertion spaces for moving the flexible food product packages through the insertion openings in the insertion direction transverse to the lengths of the first and second side walls into and out of the insertion spaces;
   e. wherein the conveyor is designed for transporting the carriers with flexible food product packages placed in the insertion spaces thereof to the one or more processing stations and with the first row of insertion spaces transportable in horizontal orientation;
   f. wherein the first side wall and the opposite second side wall defines a primary aperture for an insertion space, which primary aperture extends the distance separating the first side wall from the opposite second side wall and transversely extends the entire insertion space in a direction parallel to the first side wall and the second side wall and extends along the insertion direction; and
   g. wherein the first operating members comprise load bearing organs operable for picking up and carrying flexible food product packages, which load bearing organs projecting through the primary apertures during placing or removing of the flexible food product packages into and out of the first row of insertion spaces through the insertion openings.

2. The apparatus according to claim 1, wherein the processing stations comprise one or more heating and/or cooling stations.

3. The apparatus according to claim 2, wherein the one or more heating and/or cooling stations comprise one or more heating and/or cooling chambers.

4. The apparatus according to claim 3, wherein the conveyor conveys the flexible food product packages through the one or more heating and/or cooling chambers.

5. The apparatus according to claim 1, wherein the insertion spaces are divided by partition walls that extend between the first side wall and the opposite second side wall.

6. The apparatus according to claim 1, wherein the primary aperture opens out toward the insertion opening of a respective insertion space.

7. The apparatus according to claim 1, wherein the load bearing organs having portions extend substantially in a transverse direction relative to the side walls, delimiting the first set/row of insertion spaces.

8. The apparatus according to claim 1, wherein:
   the food product carriers extend longitudinally in a direction transversely to the direction of the movement of the conveyor; and
   the insertion openings of the individual insertion spaces are disposed transversely to the length of the food product carriers.

9. The apparatus according to claim 1, wherein:
   each food product carrier further comprises a second row of insertion spaces for flexible food product packages to be placed in, which second row of insertion spaces is at least partly delimited by the second side wall and an opposite third side wall,
   wherein the second side wall comprises at least one secondary aperture for each insertion space of the second row of insertion spaces, which secondary aperture extends the transverse direction separating the second side wall from the opposite third side wall and transversely extends the entire insertion space in a direction parallel to the second side wall and the third side wall and extends along the insertion direction.

10. The apparatus according to claim 9, wherein the load bearing organs are movable in the insertion direction while projecting through both the primary and secondary apertures during placing of flexible food product packages into the second row of insertion spaces.

11. The apparatus of claim 1, wherein the one or more first operating members operable to move a horizontal array of food packaging members simultaneously in an insertion direction into and out of the insertion spaces.

* * * * *